US010728603B2

(12) United States Patent
Spitz et al.

(10) Patent No.: US 10,728,603 B2
(45) Date of Patent: Jul. 28, 2020

(54) APPARATUS AND METHOD FOR AUTOMATIC PROVISIONING OF MERCHANDISE

(71) Applicant: AiBUY, Inc., Dallas, TX (US)

(72) Inventors: Robert K. Spitz, Amherst, NH (US); Todd Downing, Irving, TX (US); Christian Briggs, Austin, TX (US)

(73) Assignee: AiBUY, Inc., Dallas, TX (US)

( * ) Notice: Subject to any disclaimer, the term of this patent is extended or adjusted under 35 U.S.C. 154(b) by 0 days.

(21) Appl. No.: 14/644,603

(22) Filed: Mar. 11, 2015

(65) Prior Publication Data

US 2015/0264417 A1    Sep. 17, 2015

Related U.S. Application Data

(60) Provisional application No. 61/953,478, filed on Mar. 14, 2014, provisional application No. 61/953,256, filed on Mar. 14, 2014.

(51) Int. Cl.
*H04N 5/272* (2006.01)
*H04N 21/2668* (2011.01)
(Continued)

(52) U.S. Cl.
CPC ..... *H04N 21/2668* (2013.01); *G06Q 30/0264* (2013.01); *H04N 5/2723* (2013.01);
(Continued)

(58) Field of Classification Search
CPC .................................................. H04N 5/2723
(Continued)

(56) References Cited

U.S. PATENT DOCUMENTS 5,206,934 A    4/1993   Naef, III
6,446,261 B1   9/2002   Rosser
(Continued)

FOREIGN PATENT DOCUMENTS

CN          102483826 A      5/2012
WO      WO 2011/149491      12/2011
(Continued)

OTHER PUBLICATIONS

Office Action for U.S. Appl. No. 14/633,986, dated Sep. 3, 2015, 16 pages.
(Continued)

*Primary Examiner* — Michael H Hong

(57) ABSTRACT

One method includes receiving information identifying multiple products or services offered by one or more vendors and a set of criteria for each vendor, identifying base content to be presented to a user, selecting one or more of the products or services based on the criteria and the base content, and sending supplemental content associated with the selected product(s) or service(s) to an endpoint associated with the user for display with the base content. Another method includes receiving a request from a vendor associated with an e-commerce website and issuing a sub-account of a merchant processing account to the vendor in response to the request. The e-commerce website is associated with a merchant having the merchant processing account allowing the merchant to perform electronic transactions with a merchant processor, and the sub-account allows the vendor to transact directly with customers and to perform electronic transactions with the merchant processor.

23 Claims, 8 Drawing Sheets

(51) Int. Cl.
*G06Q 30/02* (2012.01)
*H04N 21/478* (2011.01)
*H04N 21/239* (2011.01)
*H04N 21/81* (2011.01)

(52) U.S. Cl.
CPC ... *H04N 21/2393* (2013.01); *H04N 21/47815* (2013.01); *H04N 21/812* (2013.01)

(58) Field of Classification Search
USPC .......................................................... 725/42
See application file for complete search history.

(56) References Cited

U.S. PATENT DOCUMENTS

| | | | |
|---|---|---|---|
| 6,608,636 | B1 | 8/2003 | Roseman |
| 6,789,120 | B1 | 9/2004 | Lee et al. |
| 7,730,132 | B2 | 6/2010 | Ludwig et al. |
| 8,150,464 | B2 | 4/2012 | Dey |
| 8,387,087 | B2 | 2/2013 | Girouard et al. |
| 8,423,467 | B1 | 4/2013 | Johansson et al. |
| 8,910,201 | B1 | 12/2014 | Zamiska et al. |
| 9,047,632 | B2* | 6/2015 | McCarthy, III .... G06Q 30/0621 |
| RE46,865 | E | 5/2018 | Schifone |
| 2002/0056109 | A1 | 5/2002 | Tomsen |
| 2003/0040962 | A1 | 2/2003 | Lewis |
| 2003/0055723 | A1 | 3/2003 | English |
| 2004/0139156 | A1 | 7/2004 | Matthews et al. |
| 2004/0153385 | A1 | 8/2004 | Allibhoy et al. |
| 2004/0244029 | A1 | 12/2004 | Gross |
| 2005/0229227 | A1* | 10/2005 | Rogers ................... G06Q 30/02 725/115 |
| 2005/0235033 | A1 | 10/2005 | Doherty |
| 2006/0132607 | A1 | 6/2006 | Kimber et al. |
| 2006/0256133 | A1 | 11/2006 | Rosenberg |
| 2007/0150370 | A1 | 6/2007 | Staib et al. |
| 2007/0260520 | A1* | 11/2007 | Jha ........................ G06Q 30/02 705/14.44 |
| 2008/0097843 | A1 | 4/2008 | Menon et al. |
| 2008/0162343 | A1 | 7/2008 | Bedier |
| 2010/0017299 | A1 | 1/2010 | Pirani |
| 2010/0077428 | A1 | 3/2010 | Arnold et al. |
| 2010/0082441 | A1* | 4/2010 | Doemling .............. G06Q 30/02 705/14.72 |
| 2010/0153831 | A1 | 6/2010 | Beaton |
| 2010/0332329 | A1 | 12/2010 | Roberts et al. |
| 2011/0071865 | A1 | 3/2011 | Leeds et al. |
| 2012/0079021 | A1 | 3/2012 | Roman et al. |
| 2013/0014155 | A1 | 1/2013 | Clarke et al. |
| 2013/0031582 | A1 | 1/2013 | Tinsman et al. |
| 2013/0054757 | A1* | 2/2013 | Spitz .................. G06Q 30/0601 709/219 |
| 2013/0151340 | A1 | 6/2013 | Barbieri et al. |
| 2013/0211891 | A1 | 8/2013 | Daniel et al. |
| 2013/0254018 | A1 | 9/2013 | Rao |
| 2014/0007155 | A1* | 1/2014 | Vemparala ......... G06Q 30/0251 725/32 |
| 2014/0019860 | A1 | 1/2014 | Sathish et al. |
| 2015/0189355 | A1 | 7/2015 | Korbecki |
| 2015/0245084 | A1 | 8/2015 | Downing et al. |
| 2017/0301003 | A1 | 10/2017 | Spitz et al. |

FOREIGN PATENT DOCUMENTS

| | | |
|---|---|---|
| WO | WO 2015/131126 | 9/2015 |
| WO | WO 2015/138612 | 9/2015 |
| WO | WO 2016/109810 | 7/2016 |

OTHER PUBLICATIONS

Office Action for U.S. Appl. No. 14/633,986, dated Nov. 23, 2016, 21 pages.
Office Action for U.S. Appl. No. 14/633,986, dated May 3, 2016, 18 pages.
International Search Report and Written Opinion for International Application No. PCT/US2015/018140, dated Jun. 3, 2015, 9 pages.
International Search Report and Written Opinion for International Application No. PCT/US2015/019979, dated Jul. 30, 2015, 10 pages.
International Search Report and Written Opinion for International Application No. PCT/US2015/068311, dated Apr. 14, 2016, 8 pages.
Kappe, F. M., "Aspects of a Modern Multi-Media Information System," Dissertation for the Award of the Academic Degree Doctor of Technical Sciences at the Graz University of Technology, Institute for Foundations of Information Processing and Computer Supported Media (IICM), Graz University of Technology, Jun. 1991, 164 pages.
Jeffay, K. et al., "System Design for Workstation-Based Conferencing with Digital Audio and Video," Proceedings of TRI COMM '91, IEEE Conference on Communications Software: Communications for Distributed Application and Systems, Chapel Hill, North Carolina, Apr. 18-19, 1991, pp. 169-177.
Reid, F. et al., "An Analysis of Anonymity in the Bitcoin System," Cha. 1 (online), <URL: https://arxiv.org/pdf/1107.4524.pdf>, May 7, 2012, 29 pages.
Office Action for U.S. Appl. No. 14/966,780, dated Mar. 9, 2017, 29 pages.
Office Action for U.S. Appl. No. 14/633,986, dated Jun. 5, 2017, 25 pages.
Supplementary Partial European Search Report for European Application No. 15760646.8, dated Jul. 21, 2017, 7 pages.
Office Action for U.S. Appl. No. 14/633,986, dated Dec. 28, 2017, 27 pages.
Extended European Search Report for European Application No. 15760646.8, dated Oct. 24, 2017, 11 pages.
Office Action for U.S. Appl. No. 14/633,986, dated Oct. 26, 2018, 27 pages.
First Office Action for Chinese Application No. 201580013586.8, dated Feb. 2, 2019, 28 pages.
Office Action for U.S. Appl. No. 15/639,786, dated Jan. 18, 2019, 9 pages.
Zhang, S., "Ganhui Firm E-Commerce Sites Construction," IT Book of CMFD, No. 3, 2012, pp. 1139-1539.

* cited by examiner

APPARATUS AND METHOD FOR AUTOMATIC PROVISIONING OF MERCHANDISE

CROSS-REFERENCE TO RELATED APPLICATIONS AND PRIORITY CLAIM

This application claims priority under 35 U.S.C. § 119(e) to U.S. Provisional Patent Application No. 61/953,256 filed on Mar. 14, 2014 and U.S. Provisional Patent Application No. 61/953,478 filed on Mar. 14, 2014. The contents of the above-identified provisional patent applications are hereby incorporated by reference in their entirety.

TECHNICAL FIELD

This disclosure is directed in general to software and more specifically to an apparatus and method for automatic provisioning of merchandise.

BACKGROUND

It is well-known that videos may be broadcast or provided through a number of media, such as television, the Internet, DVDs, and the like. To finance such video broadcasts, commercial advertisements are often placed in the videos. Commercials, however, require that a video be momentarily interrupted while the commercials are displayed. Not only is this annoying to viewers, but digital video recorders (DVRs) allow video programs to be pre-recorded. When the video programs are viewed, DVRs allow the viewers to fast-forward through commercials, thereby defeating the effectiveness and value of the commercials. When commercials are de-valued, costs are not adequately covered, and broadcast service quality suffers as a result. In many cases, costs are made up by charging viewers for video services.

In many conventional systems, a variety of different content has little or no interactivity. This includes both videos and images. For example, when viewing video, different objects in the video are often merely part of a single video stream that is inseparable with respect to the different objects. Static advertisements near the video stream related to the video are not very compelling as they are separated from the video in such a way that a user is not encouraged to interact with the static advertisement.

SUMMARY

This disclosure provides an apparatus and method for automatic provisioning of merchandise.

In a first embodiment, a method includes receiving information identifying multiple products or services offered by one or more vendors and a set of criteria for each vendor. The method also includes identifying base content to be presented to a user and selecting one or more of the products or services based on the criteria and the base content. The method further includes sending supplemental content associated with the one or more selected products or services to an endpoint associated with the user for display with the base content.

In a second embodiment, an apparatus includes at least one interface configured to receive information identifying multiple products or services offered by one or more vendors and a set of criteria for each vendor. The apparatus also includes at least one processing device configured to identify base content to be presented to a user, select one or more of the products or services based on the criteria and the base content, and initiate transmission of supplemental content associated with the one or more selected products or services to an endpoint associated with the user for display with the base content.

In a third embodiment, a method includes receiving a request from a vendor associated with an e-commerce website. The e-commerce website is associated with a merchant having a merchant processing account allowing the merchant to perform electronic transactions with a merchant processor. The method also includes issuing a sub-account of the merchant processing account to the vendor in response to the request. The sub-account allows the vendor to transact directly with customers and to perform electronic transactions with the merchant processor.

In a fourth embodiment, an apparatus includes at least one interface configured to receive a request from a vendor associated with an e-commerce website, where the e-commerce website is associated with a merchant having a merchant processing account allowing the merchant to perform electronic transactions with a merchant processor. The apparatus also includes at least one processing device configured to issue a sub-account of the merchant processing account to the vendor in response to the request, where the sub-account allows the vendor to transact directly with customers and to perform electronic transactions with the merchant processor.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system.

Figure 1:
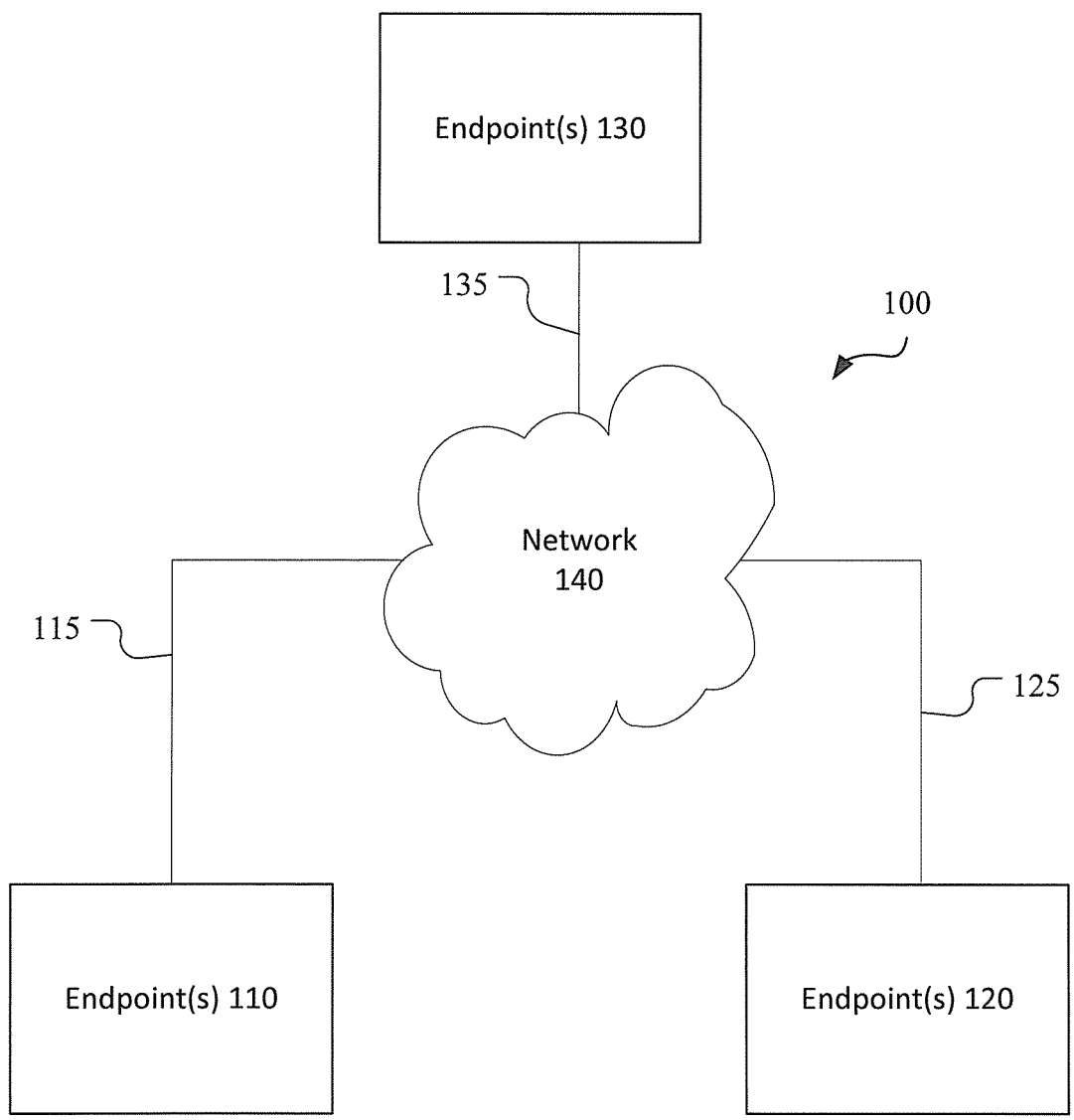
FIG. 1 illustrates an example communication system that can be utilized to facilitate communication between endpoints through a communication network according to this disclosure.

FIG. 1 illustrates an example communication system 100 that can be utilized to facilitate communication between endpoints through a communication network according to this disclosure. As shown in FIG. 1, the system 100 includes various endpoints 110, 120, and 130. In this document, the term "endpoint" generally refers to any device, system, or other structure that communicates with another endpoint. Example endpoints 110, 120, and 130 include but are not limited to servers (such as application servers and enterprise servers), desktop computers, laptop computers, netbook computers, tablet computers (such as APPLE IPADs), switches, mobile phones (such as IPHONE and ANDROID-based phones), networked glasses (such as GOOGLE GLASS), networked televisions, networked disc players, components in a cloud-computing network, or any other device or component suitable for communicating information to and from a communication network. Endpoints 110, 120, and 130 may support Internet Protocol (IP) or any other suitable communication protocol(s). Endpoints 110, 120, and 130 may additionally include medium access control (MAC) and physical layer (PHY) interfaces, such as those that conform to the IEEE 701.11 standard. An endpoint 110, 120, and 130 can have a device identifier, such as a MAC address, and may have a device profile that describes the endpoint.

A communication network 140 facilitates communications between the endpoints 110, 120, and 130. Various links 115, 125, and 135 couple the endpoints 110, 120, and 130 to the communication network 140. The communication network 140 and associated links 115, 125, and 135 may include but are not limited to a public or private data network, a telephony network, a local area network (LAN), a metropolitan area network (MAN), a wide area network (WAN), a wireline or wireless network (such as GSM, CDMA, LTE, WIMAX, 5G, or the like), a local/regional/global communication network, portions of a cloud-computing network, a communication bus for components in a system, an optical network, a satellite network, an enterprise intranet, or any other communication links or combinations of the preceding. In particular embodiments, portions of the links 115, 125, 135 or the communication network 140 may be on or form a part of the Internet.

Although the endpoints 110, 120, and 130 generally appear as being in a single location in FIG. 1, various endpoints may be geographically dispersed, such as in cloud computing scenarios. Also, each endpoint could represent a fixed or mobile device. When the endpoints 110, 120, and 130 communicate with one another, any of a variety of security schemes may be utilized. As an example, in particular embodiments, the endpoints 110 and 120 may represent clients, and the endpoint(s) 130 may represent one or more servers in a client-server architecture. The server(s) may host a website, and the website may have a registration process whereby a user establishes a username and password to authenticate or log into the website. The website may additionally utilize a web application for any particular application or feature that may need to be served up to the website for use by the user. Additionally, in particular configurations, the communication between the endpoints 110 and 120 may be facilitated using a communication path through the endpoint 130.

Various embodiments described in this patent document may benefit from and/or utilize SMART CONTAINER technology from CINSAY, INC., which is briefly described below and is described more fully in U.S. Pat. No. 8,769,053 (which is hereby incorporated by reference in its entirety). This technology provides an innovative way for merchants and vendors to reach their customers online. In the traditional online sales model, merchants and vendors need to create search or display ads that show up when online consumers visit search engine sites or various web properties. If a consumer sees an interesting ad related to a product or service, the consumer needs to leave his or her current activity and visit some other web destination to discover more information or make an online purchase. Consumers have specific online behavior patterns. If consumers are actively shopping, the traditional multistep model is workable. The traditional advertising sales model requires that a consumer stop what he or she is doing and visit some other online destination. However, if consumers are on social sites interacting with friends, reading the news, playing games, or engaging in other online activities, they are much less likely to leave their current activities to visit some external Internet destinations.

The SMART CONTAINER model brings product information or a store to the consumer. The SMART CONTAINER code/technology virally syndicates across the web, for example, using components described with reference to FIGS. 1 and 7 or using other components. It is ideal for those types of destinations that online consumers tend to frequent, such as social networks and blogs. Regardless, if the SMART CONTAINER code is located on a web page, a blog article, a social network page or wall, or a mobile device, a consumer can complete a transaction right there with no need to be diverted to some external destination.

SMART CONTAINER objects are intelligent Internet objects that virally syndicate and propagate across the web and other connected networks and mobile devices. They can be configured in a variety of ways to address the entire value chain of online marketing and shopping. This includes impressions, clicks, lead generation, and performing e-commerce transactions. A modern shopping experience works best when interactive media is used. One of the most appealing forms of media for sales and shopping is video. It allows a much more lifelike representation than text or static pictures. It also creates a much richer product browsing or shopping experience.

SMART CONTAINER code is normally configured with a video player window, a selection of products or services being offered, and a variety of related video clips. This collection of video clips allows a consumer to learn more about the products or services being offered. The consumer can select any of these offered items to get more details, all enclosed within the SMART CONTAINER technology.

The offered items (products or services) may be items being advertised or sold. Depending on the type, the SMART CONTAINER code may allow a consumer to request to be contacted, or even purchase the object, right there. The consumer need not leave his or her current activity or web page. Offered items could also include or be associated with discounts or coupons. They may even be an opportunity to donate to a charity or political campaign. Of course, sometimes it does make sense to visit another Internet designation, and if appropriate the consumer can certainly be linked there as well.

Because the SMART CONTAINER code handles all the complexity, it can turn the simplest website into an instant e-commerce store. This enables anyone to transact online without having to deal with the complexity of setting up an e-commerce site. For merchants with an e-commerce site, it readily enables a much richer shopping experience. For the creative hobbyist or local band, it lets them readily sell directly to interested consumers. To support and promote them, supplemental items in the SMART CONTAINER code called ON-DEMAND merchandise can be offered. Merchants can custom design a selection of apparel with their art and graphics to be sold along with their own creations. ON-DEMAND fulfillment dynamically produces and ships their custom apparel for them, eliminating the need to manage inventory and providing their online customers with a richer line of products. Of course, because their instant e-commerce stores are based on SMART CONTAINER objects, it can also propagate out onto all forms of viral syndication methods as well.

The SMART CONTAINER code is also auto-customizing according to particular configurations. If a device is a traditional personal computer (PC) or laptop, it will render using optimal technology, which for this purpose could represent FLASH. On mobile devices such as IPHONEs, IPADs, or ANDROID phones, this means HTML5 or a native interactive app will likely get used. The items in the SMART CONTAINER code also know about each other according to particular configurations. When a video is playing, a container can update product and service objects being shown that correspond with the particular sequence in a video segment. It allows a "mini QVC" shopping channel to be created and syndicated across the Internet. Beyond device type, there are other dimensions of customization. Smaller devices and some environments such as social sites restrict window sizes, so the SMART CONTAINER code adapts. In addition, it may be appropriate to provide different content based on geolocation, so the SMART CONTAINER code can customize for these, as well.

The SMART CONTAINER code virally syndicates across the Internet following the more popular network paths. SMART CONTAINER objects can be hosted on traditional web pages or blogs, contained in emails, operate on mobile devices, or propagate social networks. Because the SMART CONTAINER code is flexible, it can also be set up in the form factor of a display ad unit and distributed via ad servers on display advertising networks. When the code exists on social networks like FACEBOOK, it can ride the wave of user "likes." For example, if a woman shopper likes some great shoes shown in a SMART CONTAINER object interface, the SMART CONTAINER object can propagate directly to their "wall." Now all of her friends see the SMART CONTAINER object and can view or transact right there on their own walls. Of course, if any of her friends also "like" it, the SMART CONTAINER object propagates and rides the wave further out into that branch of the social network, yielding a potential exponential growth factor. The container does not necessarily involve products like shoes. As another example, a container can support a politician running for office. His or her supporters may be passionate about a message and "like" it, again making it available to their networks. Now, similarly-minded political supporters can view those messages and, if so moved, donate to the cause. Yet another example is sports. In this case, a sports fan may wish to watch content on his or her high-definition (HD) large screen television. More and more users have interconnected devices such as ROKU and CHROMECAST devices, and the SMART CONTAINER code may be sent to such IP television boxes, as well.

When merchants launch and syndicate their SMART CONTAINER objects onto the Internet, they want to know how their campaigns are performing. SMART CONTAINER objects report back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop a marketing or sales campaign.

Another form of tracking relates to how the SMART CONTAINER code is propagated. A vendor may wish to use affiliates to help syndicate them and pay them a percentage based on the transactions resulting from their work. SMART CONTAINER objects can be tagged with affiliate tracking identifiers, allowing status reports and transactions from container instances or their descendants to be properly filtered. Another tracking usage may be for a politician to assign affiliate codes to his or her supporters and be able to measure whose efforts result in the most new supporters.

SMART CONTAINER objects are designed to be highly scalable according to particular configurations. Rather than burden a single website with massive traffic (which would result from a traditional model of bringing all consumers to a store), SMART CONTAINER code operates in a distributed manner. For example, the SMART CONTAINER code can execute where it is located, such as on a blog, a social network, or a mobile device. SMART CONTAINER objects fetch their instructions when started and then gather their product items and video streams from a worldwide distributed content delivery network. This results in a highly scalable architecture, allowing millions of concurrent consumers.

By bringing the store to the customer, the SMART CONTAINER code enables many new ways for merchants and vendors to connect with their consumers without disrupting the consumers' web activities. The end result is to connect the consumers directly with the merchants, eliminating the middleman and promoting a much more natural shopping experience.

The functionality of the above description may avail from any suitable components, such as those described in FIGS. 1 and 12 or other suitable components. The code itself may be written in any suitable format, including but not limited to JAVA, C++, C-sharp, HTML, HTML5, JAVA SCRIPT, PYTHON, RUBY, and the like.

There exists a variety of content in the world that is independent, existing separate from any special containers such as that invoked by the SMART CONTAINER code. Certain embodiments of this disclosure seek to harness the power of such content by dynamically binding supplemental content to underlying base content. As a simple example, a video may be streamed from a content server such as provided by one of many video streaming services. The base content represents any type of visual or audio content, be it a picture, a streaming video, a live stream from a remote location, real-time content from the current location of a device, a web page, or other types of visual content. The supplemental content represents additional information related to the base content and/or a user accessing the base content. Supplemental content can include products or services, information about the products or services, and the like.

FIGS. 2A through 2E illustrate an example dynamic binding of supplemental content to base content according to this disclosure. As seen in FIGS. 2A through 2E, a base content 200 is generally shown. The base content 200 could represent any of the types of visual or audio content described above. The supplemental content represents additional information related to the base content and/or a user accessing the base content. In some embodiments, the supplemental content can override the module playing the base content and expand the functionality of the module (such as with YOUTUBE).

In particular embodiments, the supplemental content may include additional information, configurable controls, selectable configurations, content transactional items such as products or services, and the like. Content transactional items can be referred to as supplemental transactional items or supplemental transaction items and can be part of supplemental content. Although the displayable area for the base content 200 is generally shown as having a rectangular boundary area, the displayable area for the base content 200 may take on other shapes. Additionally, the base content 200 may be shown in (or through) a virtually limitless number of devices, from mobile phones to computers to televisions.

As examples of the above, the base content 200 may be a video streamed through a video-based provider, such as YOUTUBE, VIMEO, NETFLIX, REDBOX INSTANT or others, being viewed on a computer, a mobile device, a television screen, or any other suitable device or devices. The base content 200 may also be a real-time view of content at a current location being viewed through an electronic device such as GOOGLE GLASS or a real-time view in a mobile computing device such as a tablet or phone. In yet other configurations, the base content 200 may be an image. In still other configurations, the base content 200 may be a web page.

Figure 2A:
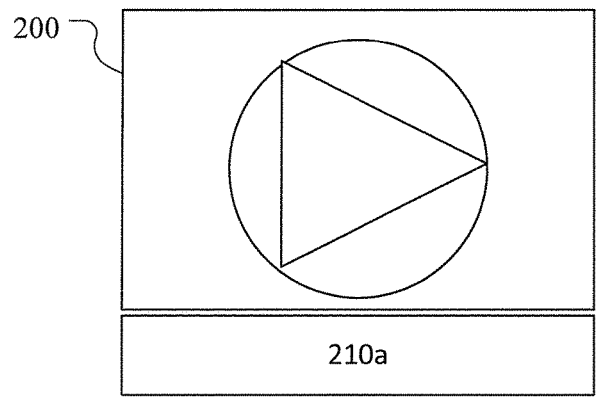
FIGS. 2A through 2E illustrate an example dynamic binding of supplemental content to base content according to this disclosure.
Figure 2B:
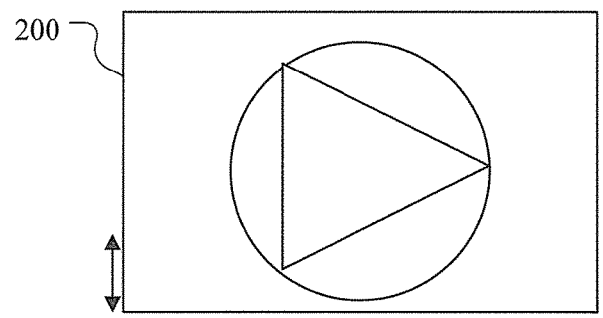
Figure 2C:
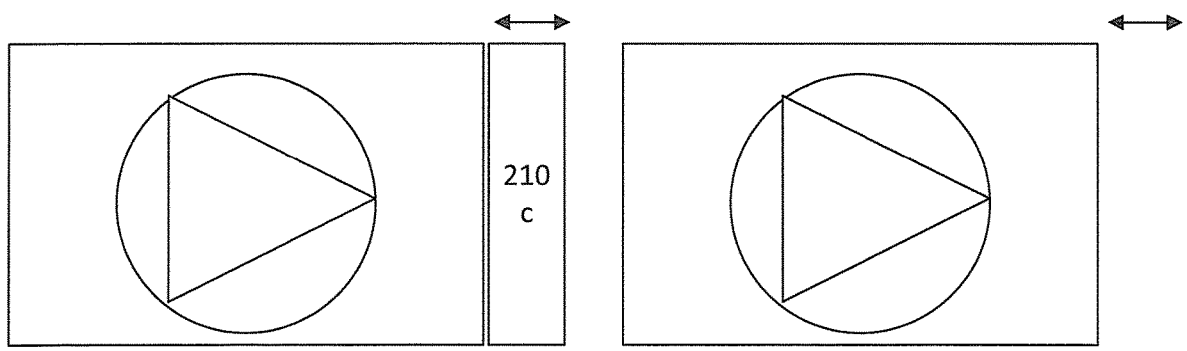

Also shown in FIGS. 2A through 2E are non-limiting examples of supplemental content 210a-210e that are configured to dynamically bind to the base content 200. Although certain examples are provided, it should be understood that such examples are non-limiting and other configurations may be utilized as will become apparent to one of ordinary skill in the art having read this disclosure. In some configurations, the supplemental content may overlay the base content, whether partially transparent or not. Examples of supplemental content 210b and 210e overlaying the base content 200 are shown in FIG. 2B (left position) and FIG. 2E. In other configurations, the supplemental content may be positioned outside of the base content 200, such as to the left, right, top, bottom, or other positions. Examples of supplemental content 210a, 210c, and 210d outside of a boundary area of the base content 200 are shown in FIG. 2A, FIG. 2C (left position), and FIG. 2D.

In certain configurations, the supplemental content may be selectively displayable and/or selectively "hideable," such as due to user action or inaction. For example, in some configurations, a user interacting with a container for the base content may cause a menu with supplemental content to appear. Examples of these configurations are shown in FIGS. 2B and 2C with the double-edged arrows representing selective display-ability or selective hide-ability.

Figure 2D:
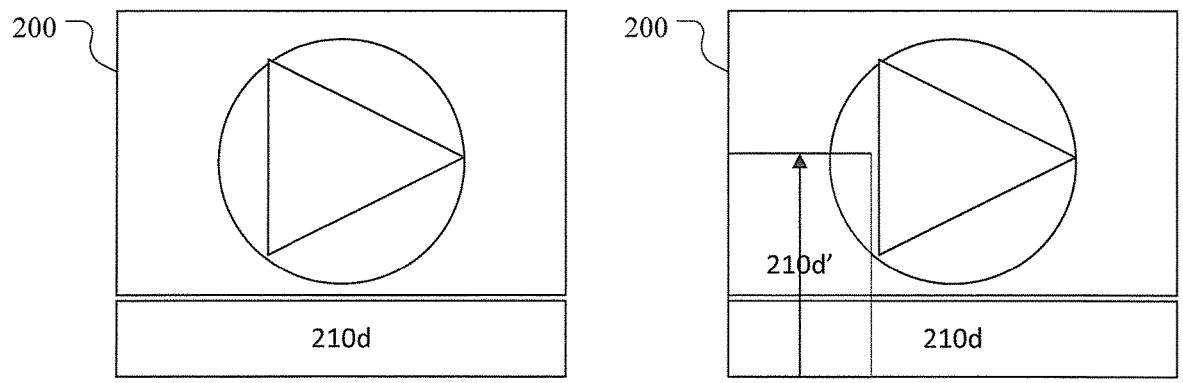
Figure 2E:
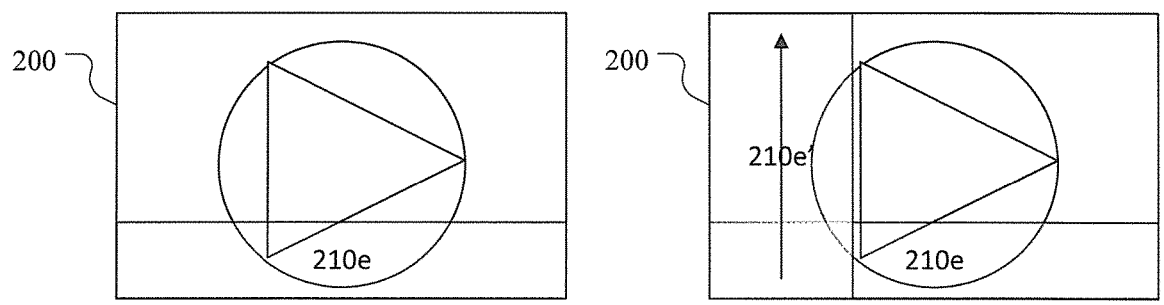

In still other configurations, the supplemental content may begin outside an area of the base content 200 and expand to cover, partially transparent or not, the base content 200. For example, as seen in FIG. 2D, the position of the supplemental content 210d on the left is just below a displayable area for the base content 200. However, in the position of the supplemental content 210d on the right (which may be the result of interactivity by a user), the supplemental content 210d expands to at least partially overlay the base content 200 (as shown by an area 210d'). A similar configuration is also shown in FIG. 2E except that the supplemental content 210e began as an overlay of the screen and an area 210e' covers an entire edge of the displayable area for the base content 200.

In particular configurations, the supplemental content is independent of the base content 200 and is bound dynamically as the base content is displayed. For example, in particular settings, a web page may have a container (such as an embed code) that instantiates (loads or invokes) (i) the base content and (ii) the supplemental content. According to certain configurations, a call for supplemental content can be based on what is being shown in the base content, with the supplemental content specifically relating to the base content. Additionally, the supplemental content may be based on other parameters, such as a user profile or a geolocation of the user viewing the base content. As another example, in other configurations, a page analyzer can review a web page to determine locations where base content is contained and overlay or adjust such base content.

According to this specification, the concept of "binding" refers to associating supplemental content with base content, whereas "dynamic binding" refers to associating content on the fly, such as upon detection of the base content. In particular configurations, the initial association may allow the subsequent sharing of both the supplemental content and the base content together. More particularly, in certain configurations, an initial dynamic binding yields a shareable container (which may or may not be instantiated by an embed code) that, upon being shared to a new device, instantiates the underlying base content and the supplemental content. In other configurations, no such container is created, and a dynamic binding or dynamic association of the supplemental content is done for every playing of the video. In yet other configurations, supplemental content may be bound to a video, and the particular content is dynamically determined when the video is requested for playback.

A variety of technologies may be used for the above-described dynamic binding. As an example non-limiting configuration, the supplemental content may be configured as one layer in a display, where the base content is another layer. In such configurations, the layer for the supplemental content may be forward in the layers to allow an overlay as might be appropriate. In other configurations, the supplemental content may simply be provided a positioning with respect to the base content.

In particular configurations, the supplemental content can be dynamically sized based on a determined size of the base content and/or the spacing configurations for the device on which the base content and the supplemental content will be displayed. In other configurations, given a particular size for the base content, the supplemental content may use the same size for a container that requests a slightly reduced-size base content with extra room for the supplemental content. In implementing such a configuration, the technology can intercept a request for the base content and redirect such a request in order to request a container that, in turn, requests the base content and then the supplemental content. This latter configuration may be beneficial for scenarios where the supplemental content does not overlay the base content.

In particular configurations, the supplemental content can be based on what is being shown in the base content 200. A variety of technologies may be utilized to recognize the base content 200. Additionally, in particular configurations, a combination of technologies may be utilized. Further, as discussed in more detail below, the supplemental content can be customized depending on a user and/or device.

One problem faced by vendors in an online environment is an inability to known what types of products or services to present for sale along with video or other content presented by the vendor. Additionally, even if a vendor has a general idea of what products or services to sell, the vendor may have no insight into what types of products or services would sell the best for displayed content in a SMART CONTAINER.

In one aspect of this disclosure, a platform provides for the automatic configuring and provisioning of one or more products or services that may be synergistic with a video. For example, a video may have business logos or shirts/other sellable merchandise items presented within the video that could be configured as sellable on-demand products within a SMART CONTAINER. Also, in some embodiments, a vendor may be able to further customize its offerings by adding logos, text, or images and updating its products or services. In addition, in some embodiments, pricing could be automatically set based on product/service type, complexity, inventory, demand, and the like.

Figure 3:
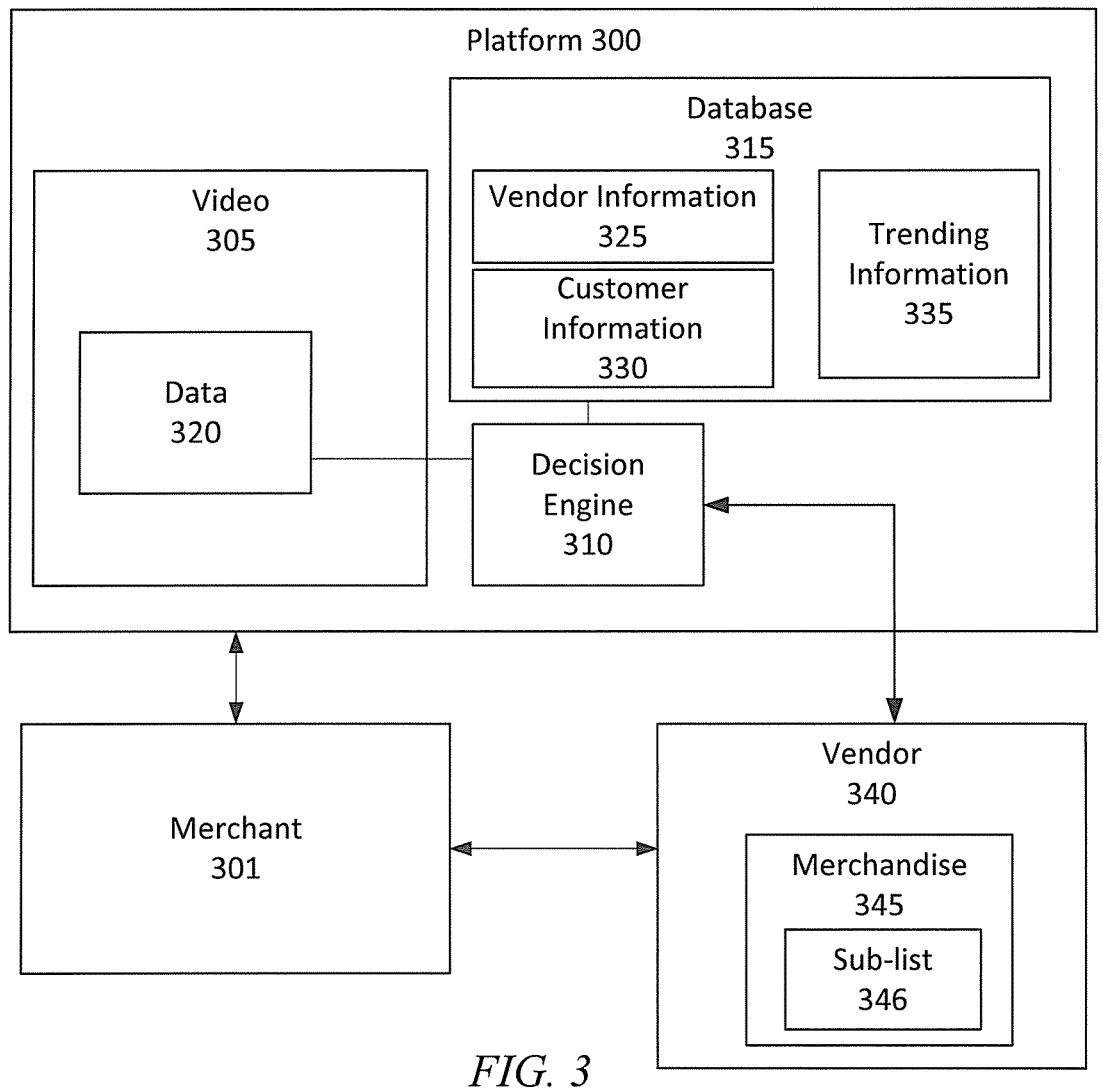
FIG. 3 illustrates an example platform for a product generation system according to this disclosure.

FIG. 3 illustrates an example platform 300 for a product generation system according to this disclosure. As described above, supplemental content 210 may contain interactive items that allow users to purchase products or services being displayed within the base content 200. Additionally, as part of the supplemental content 210 or separate therefrom, options to share the base content 200 and the supplemental content 210 can be provided. Non-limiting sharing examples include sharing via a social network like FACEBOOK, GOOGLE+, and LINKEDIN; sharing via an embed code (such as code inserted into a blog or a website); and sharing via an email.

In some embodiments, at least one merchant 301 implements or operates the platform 300, while at least one vendor 340 offers merchandise 345 (such as one or more products or services) to customers via the platform 300. In particular embodiments, the merchant 301 can be defined as an entity that presents an e-commerce site or SMART CONTAINER to a customer and collects payment from the customer, and the vendor 340 can be defined as an entity that owns the merchandise 345. When the merchant 301 sells a product or service, the merchant 301, vendor 340, or third-party company may fulfill the sale. Depending on the implementation, a merchant 301 and a vendor 340 could represent the same entity or different entities.

The platform 300, according to certain configurations, can include one or more videos 305 (such as base content 200 or the like), a decision engine 310, and a database 315. Although video 305 is described in FIG. 3, other configurations may include other forms of content, such as audio or images. In some embodiments, the platform 300 may be instantiated in a SMART CONTAINER. The video 305 may generally correspond to whatever base content the vendor 340 is using to sell products or services. The video 305 includes some form of data 320, which may include audio, text, images, or the like.

The decision engine 310 can be configured to identify the data 320 in order to determine what is being shown in the base content. Any suitable technique may be utilized to analyze the data including, but not limited to, audio recognition, image recognition, audio and/or video fingerprint detection, text extraction, or the like. In particular configurations, the data 320 may be compared to vendor information 325 in the database 315 in order to determine the appropriate context of the video 305.

In some embodiments, the vendor information 325 may include, but is not limited to, what products or services the vendor 340 currently sells, what logos are associated with the vendor 340, what market(s) that the vendor 340 is in, other information about the vendor 340, and the like. As a non-limiting example, the data 320 may indicate that the vendor 340 is a sporting goods company. Through separate information (extracted from any appropriate source whether provided by the vendor 340 or not), the vendor information 325 may provide additional information, such as information indicating that this particular vendor 340 sells baseball bats. With such information, the decision engine 310 can make a more informed decision as to what products or services would be optimized to sell with the video 305. In particular configurations, the vendor information 325 may also be used to enhance the detection of the data 320. As another non-limiting example, the vendor information 325 may have a high-quality version of a vendor's logo, whereas the video 305 has a lower-quality version of the vendor's logo. The high-quality version of the logo (provided by the vendor or not) can be used to recommend selected products containing such a logo, a vendor 340 related to the logo, or a competing vendor to the vendor of the logo.

The database 315 may also include customer information 330 associated with one or more customers. The customer information 330 can include, but is not limited to, customer transactions, customer demographic information, and the like. Customer information 330 may indicate trends and statistics on customer purchases. Customer information 330 may also include general information about categories of customers. For example, the customer information 330 may indicate that coffee mugs or t-shirts are very popular for certain categories of services. This customer information 330 need not be limited to customers of the vendor 340 or merchant 301. Rather, in some configurations, the customer information 330 may include a much large data set, including customers of other vendors and merchants for which transactional analytics are gathered. As a particular example, the customer information 330 may indicate that coffee mugs or t-shirts may be popular with respect to vendors in the sports market as indicated by prior analytics gathered concerning vendors in that market. In certain configurations, the decision engine 310 may value the customer information 330 at a higher level when such data directly corresponds to customers of the vendor 340.

In some embodiments, the vendor 340 may be a merchant 301 and sell directly to customers. In other configurations, the vendor 340 may sell through a merchant 301. The merchant 301 could aggregate products or services from different vendors 340 in a merchant store. Allowing a merchant 301 to sell products or services for the vendor 340 allows the vendor 340 to conduct flash or one-time-only sales and generally offer more flexibility in online marketplaces.

The database 315 may also include trending information 335, which identifies possible trends in products or services that may be desired by customers. For example, the trending information 335 may indicate that the OSCARS are on television at that moment. In this example, the decision engine 310 may brand OSCAR-related merchandise for use in an e-commerce container (such as a SMART CONTAINER) of the vendor 340.

In particular configurations, the decision engine 310 uses the data 320 and information from the database 315 to determine what products and/or services (merchandise 345) would be appropriate for a vendor 340 to sell with an e-commerce container displaying the video 305. For example, the decision engine 310 may identify a logo of a vendor in data 320, and the decision engine 310 may configure t-shirts, coffee mugs, hats, or other products and place those items into the vendor's e-commerce site. Alternatively, the decision engine 310 could make a recommendation as to products or services, provide the vendor or merchant an opportunity to further configure the merchandise 345 for sale, and receive approval from a user associated with the vendor or merchant. As another example, an athlete may be holding a trophy. In this example, the decision engine 310 may configure a trophy, a jersey of that player, or other team gear for the team that is associated with the player. As yet another example, the decision engine 310 may identify a logo of a vendor in data 320 and obtain vendor information 325 indicating that the vendor is an airline. The decision engine 310 may configure items related to the airline, such as luggage, passport holders, and the like, and place those items into an e-commerce container (such as a SMART CONTAINER) of the vendor 340.

In particular configurations, the decision engine 315 (having access to information in the database 315) provides an optimized set of products and/or services for a vendor 340 to sell in conjunction with a displayed video 305. Because the data in the database 315 is dynamic, a recommendation may change over time based on feedback analytics, not only from the vendor's customers but also from other data gathered on other transactions for other customers of other vendors (and stored in the customer information 315).

In particular configurations, the decision engine 310 may detect media in the data 320 that can be turned into a three-dimensional object. Such a three-dimensional object can be created on-demand using a three-dimensional printer and shipped quickly. Alternatively, the product (three-dimensional or not) could be created on-demand, and a patron can travel to a local facility to pick up the product on the same day. In yet other configurations, same-day delivery may be provided.

In some embodiments, a vendor 340 may produce a sub-list 346 of merchandise 345 for sale through an e-commerce site controlled by the merchant 301. The sub-list 346 identifies a subset of all merchandise 345 available from the vendor 340. For example, during a sale, the vendor 340 could provide the merchant 301 with a sub-list 346 identifying inventory items that have not sold as expected. A sub-list 346 can be generated manually by a vendor 340, automatically by a set of rules selected by the vendor 340, dynamically, or using a selection engine (such as a backend engine controlled by the SMART CONTAINER provider). If generated automatically, the sub-list can be presented to a user for approval. In other embodiments, a further sub-list can be generated in a like manner or using different rules. For instance, a vendor 340 may select a sub-list 346 of overstocked products, and the decision engine 310 may further refine the sub-list 346 based on the data 320 of a video 305. The rules may include a set of criteria or have some other form.

In some configurations, the platform 300 can control the pricing for each product or service dynamically. For example, when a product is selling quickly and supply is getting low, the decision engine 301 can adjust the price of the product higher. In particular embodiments, the vendor 340 or merchant 301 can set defined maximum and minimum ranges of a price or time periods where dynamic pricing is possible/not possible.

In some embodiments, the customer information 330 can further include information about times that particular products/services or types of products/services sell the best, times that particular demographics buy particular products/services, numbers/types of websites visited by customers, and the like. The decision engine 310 can use any of this information to select products/services to be offered by vendors 340.

Each instance of an e-commerce site can manifest a different set of products/services for the same video 305. The different instances of the selection of products/services can depend on various information from the database 315 or other information.

Figure 4:
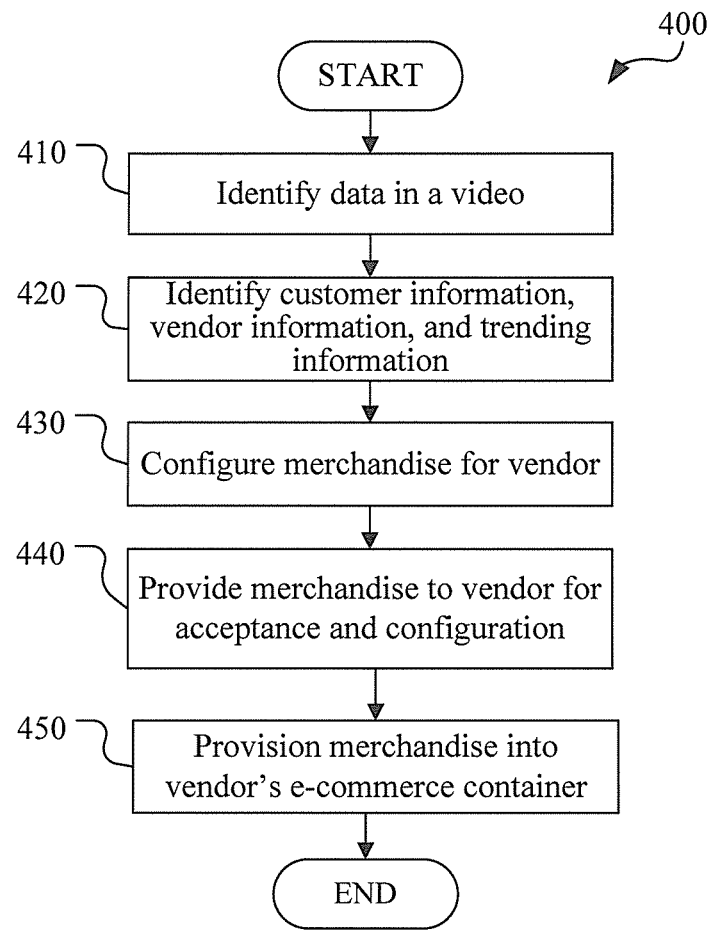
FIG. 4 illustrates an example process for configuring merchandise according to this disclosure.

FIG. 4 illustrates an example process 400 for configuring merchandise according to this disclosure. For ease of explanation, the process 400 is described with reference to the platform 300 of FIG. 3. At operation 410, a decision engine identifies data in a video. The data may include objects, companies, logos, and the like in a video 305. Any suitable technology may be utilized to detect such data, including image, video, or audio recognition in certain configurations. Other recognition technologies could also be used.

At operation 420, the decision engine identifies customer information, vendor information, and trending information from a database in order to determine an optimum set of product and/or services for a vendor to sale. The database 315 may include a historical record of customers' past purchases and information related to vendors. In particular configurations, the database 315 may additionally include other types of data that can assist in determining optimum sets of products and/or services to be sold alongside particular base content in a container.

At operation 430, the decision engine configures merchandise for a vendor. The merchandise may be configured based on data from the video 305, customer information, vendor information, trending information, or combinations thereof. At operation 440, the decision engine provides recommended merchandise to a vendor for acceptance and configuration. For example, the decision engine may submit the merchandise for review and final configuration. At operation 450, the decision engine may provision the merchandise into the vendor's e-commerce store. This operation may be performed in response to the vendor accepting the proposal of the merchandise from the decision engine. However, in other embodiments, the decision engine may automatically submit merchandise to the vendor's store.

Although the decision engine 310 has been described above as providing particular recommendations of product/services to sell, multiple versions of the same type of product/service can be recommended based on the customer. As a simple example, two versions of the same t-shirt (one in pink and one in blue) could be offered, where one version is displayed to male patrons and another version is displayed to female patrons. Other versions can similarly be recommended based on other criteria, such as geography and the like.

Another problem faced by vendors in an online environment is the inability to set up merchant processing accounts. A merchant processor may require a number of items from a vendor to set up a merchant processing account for the vendor, and the account creation process may therefore take a long time. During this time, the vendor is losing out on sales.

In another aspect of this disclosure, a platform provides immediate access to features of a merchant account immediately after a user has created a video e-commerce container. In particular configurations, the merchant or vendor is immediately granted a sub-account by an entity that already has a merchant account. The merchant account may also be referred to as a merchant processing account. Additionally, in certain configurations, an application for a full merchant account may be filed on behalf of the vendor while the vendor is using the features for the merchant account from the sub-account. Also, in some embodiments, the sub-account may be monitored, and a full merchant account may be filed for and/or granted after reaching a certain threshold of transactions or revenue.

Figure 5:
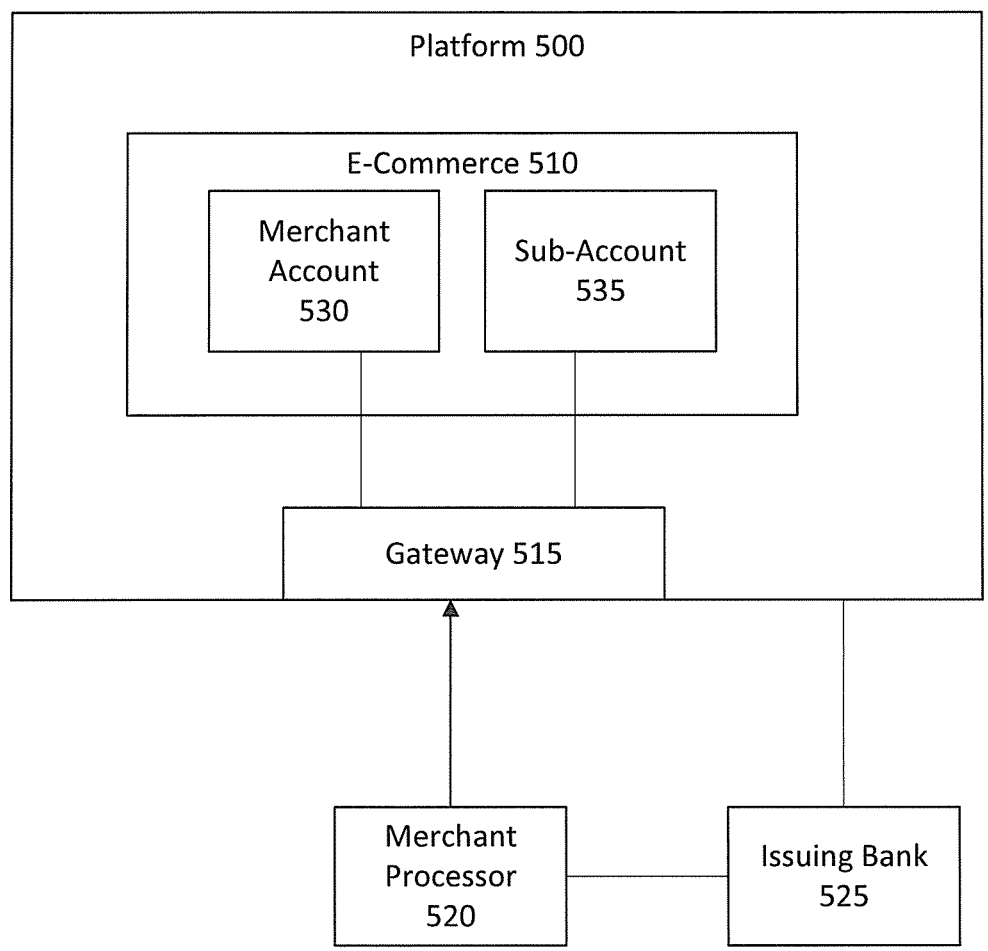
FIG. 5 illustrates an example platform for granting a merchant processing account according to the disclosure.

FIG. 5 illustrates an example platform 500 for granting a merchant process account according to the disclosure. Again, the platform 500 can be used with base content 200 and supplemental content 210, where the supplemental content 210 contains interactive items that allow users to purchase products or services being displayed within base content 200. Options to share the base content 200 and the supplemental transactional items 210 can also be provided.

The platform 500, according to certain configurations, can have an e-commerce component 510 and a gateway component 515. A customer uses the e-commerce component 510 to purchase products or services sold by a vendor. The e-commerce component 510 may also be referred to as an e-commerce site. The gateway component 515 enables a merchant processor 520 to receive data regarding the purchase. Each component 510-515 could be implemented using hardware or a combination of hardware and software/firmware instructions.

As recognized by particular embodiments, some data may enter the platform 500 from the merchant processor 520 and/or an issuing bank 525. A non-limiting example of the issuing bank 525 includes a bank that has a relationship with a customer and vouches for purchases made by the customer (including, but not limited to, VISA, MASTERCARD, and the like). A non-limiting example of the merchant processor 520 includes a company that accepts a credit card or debit card used by a customer to purchase something via the e-commerce component 510 and negotiates payment from a bank on behalf of the vendor (including, but not limited to, WORLDPAY, INTUIT, and the like).

In some embodiments, the e-commerce component 510 may include or be associated with a merchant account 530 and a sub-account 535. A merchant account 530 may be similar to a bank account issued by the merchant processor 520. Money collected from e-commerce sales can be distributed to the merchant processor 520 by the issuing bank 525 and then sent to the vendor's merchant account 530.

In some embodiments, the sub-account 535 may be similar to a merchant account but is granted by the owner/operator of the gateway component 515 or platform 500 (such as CINSAY, INC.) or another entity willing to assume the risk on behalf of the vendor or user. The sub-account 535 may receive money from the owner/operator of the gateway component 515 or platform 500 via the merchant account 530 instead of directly from the merchant processor 520.

In certain configurations, a vendor may begin with a sub-account 535 working under the authority of another. In some configurations, the functionality of the sub-account 535 may seamlessly transition to a merchant account 530 without any notice from a customer visiting the vendor's container/e-store. In other configurations, a sub-account 535 may never transition over to a merchant account 530.

Although particular payments have been shown and described above, it should be understood that other payments may avail from teachings of this disclosure. In particular, for an immediate access to credit card or debit card processing, a vendor may be granted immediate access under the authority of another entity (via a sub-account 535), where the other entity assumes the risks on behalf of the vendor (the other entity has contracts in place for the payment process). This assumption of risk may shift over to the vendor in a technologically-seamless manner while the vendor is creating its own contractual arrangements with those in the payment processing scheme. During such a scenario, risk may be minimized by (among other things) limiting the amount of transactions a user can have processed via the sub-account 535.

As examples of the preceding, digital currency exchanges (such as BITCOIN) and private payment networks (such as PAYPAL) can avail from the teachings of this disclosure. A sub-account 535 can be created for immediate payment feature access, with the possible transition to a full account 530 at a later time.

Figure 6:
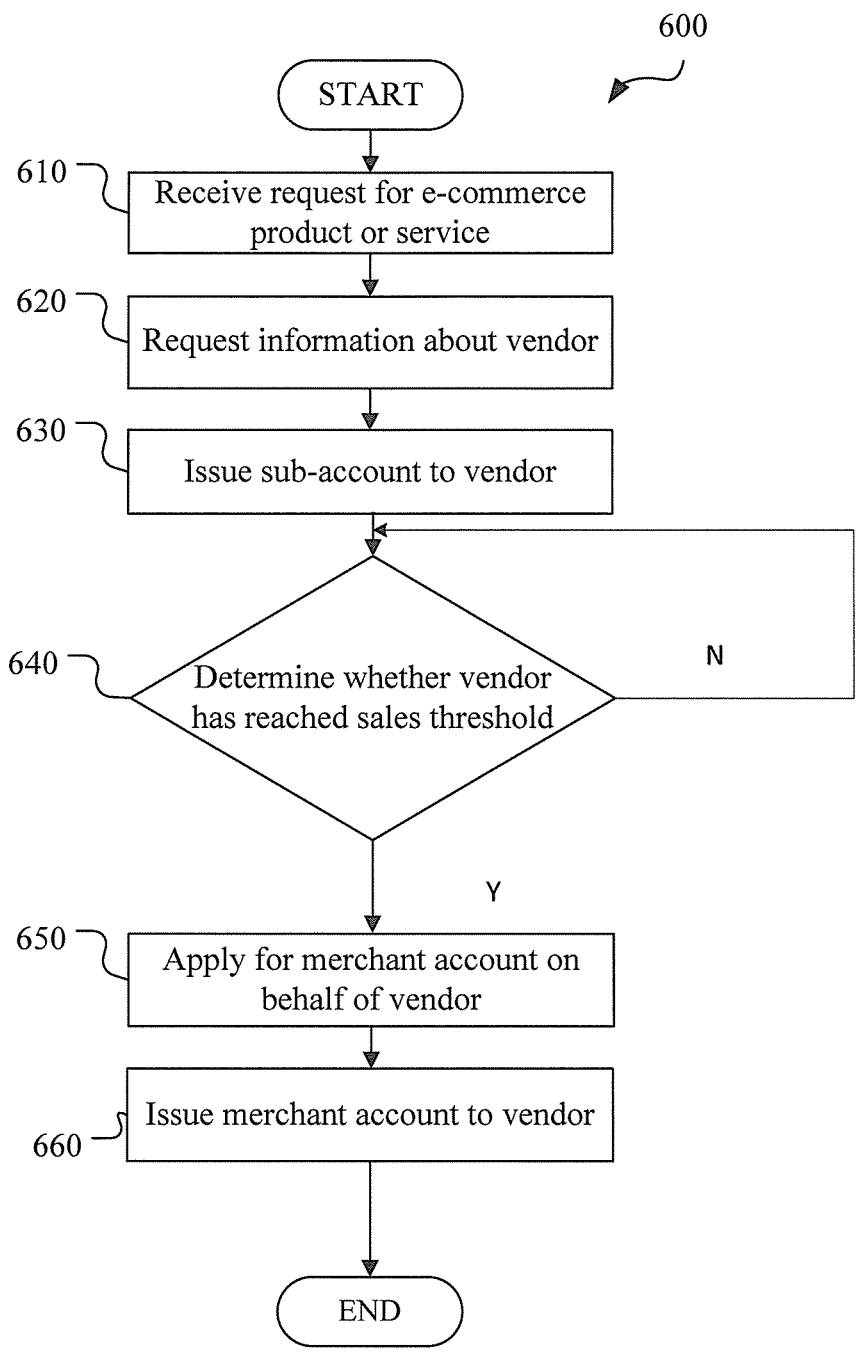
FIG. 6 illustrates an example process for granting a merchant account according to the disclosure.

FIG. 6 illustrates an example process 600 for granting a merchant account according to the disclosure. For ease of explanation, the process 600 is described with reference to the platform 500 of FIG. 5. At operation 610, a request for a vendor's e-commerce product or service is received, such as at a video e-commerce container or the like. At operation 620, information about the vendor is requested. For example, this information may be, but is not limited to, bank account information, projected sales, credit checks, and the like.

At operation 630, a sub-account is issued to the vendor. A sub-account may appear similar to a merchant account from the perspective of the vendor. The sub-account may be under a full merchant account of the owner/operator of a gateway component or the hosting site where the vendor's e-commerce product/service is listed.

At operation 640, a determination is made whether the vendor has reached a sales threshold. The threshold may be based on transactions, average amounts of the transactions, total sales volume, and the like. If so, at operation 650, a merchant account for the vendor is applied for on behalf of the vendor. The information obtained in operation 620 can be used to apply for the merchant account. The owner/operator of a gateway component or the hosting site where the vendor's e-commerce product/service is listed may have agreements in place with merchant processors for this type of account setup. At operation 660, a merchant account is issued to the vendor, at which point the vendor's own merchant account is used instead of the sub-account. The merchant account issuance may be seamless and unnoticeable from the perspective of the vendor or its customers. Note that in other embodiments, a sales threshold may not be needed, and the merchant account can be issued to the vendor immediately upon receiving it from a merchant processor.

Figure 7:
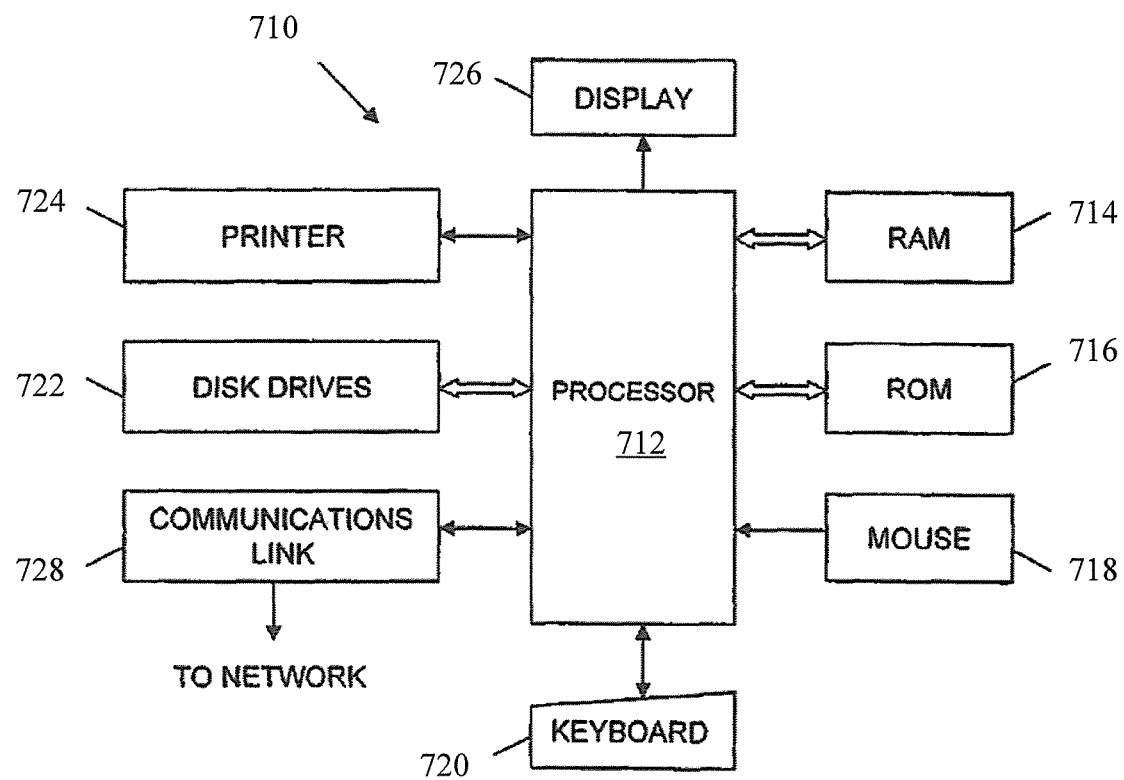
FIG. 7 illustrates an example computing device supporting various functions according to this disclosure.

FIG. 7 illustrates an example computing device 700 supporting various functions according to this disclosure. The computing device 700 here could be used to implement any of the techniques or functions described above, including any combination of the techniques or functions described above. The computing device 700 may generally be adapted to execute any of suitable operating system, including WINDOWS, MAC OS, UNIX, LINUX, OS2, IOS, ANDROID, or other operating systems.

As shown in FIG. 7, the computing device 700 includes at least one processing device 712, a random access memory (RAM) 714, a read only memory (ROM) 716, a mouse 718, a keyboard 720, and input/output devices such as a disc drive 722, a printer 724, a display 726, and a communication link 728. In other embodiments, the computing device 700 may include more, less, or other components. Computing devices come in a wide variety of configurations, and FIG. 7 does not limit the scope of this disclosure to any particular computing device or type of computing device.

Program code may be stored in the RAM 714, the ROM 716 or the disc drive 722 and may be executed by the at least one processing device 712 in order to carry out the functions described above. The at least one processing device 712 can be any type(s) of processing device(s), such as one or more processors, microprocessors, controllers, microcontrollers, multi-core processors, and the like. The communication link 728 may be connected to a computer network or a variety of other communicative platforms, including any of the various types of communication networks 140 described above. The disc drive 722 may include a variety of types of storage media such as, for example, floppy drives, hard drives, CD drives, DVD drives, magnetic tape drives, or other suitable storage media. One or multiple disc drive 722 may be used in the computing device 700.

Note that while FIG. 7 provides one example embodiment of a computer that may be utilized with other embodiments of this disclosure, such other embodiments may utilize any suitable general-purpose or specific-purpose computing devices. Multiple computing devices having any suitable arrangement could also be used. Commonly, multiple computing devices are networked through the Internet and/or in a client-server network. However, this disclosure may use any suitable combination and arrangement of computing devices, including those in separate computer networks linked together by a private or public network.

The computing devices 700 could represent fixed or mobile devices, and various components can be added or omitted based on the particular implementation of a computing device. For example, mobile devices could include features such as cameras, camcorders, GPS features, and antennas for wireless communications. Particular examples of such mobile devices include IPHONE, IPAD, and ANDROID-based devices.

Although the figures above have described various systems, devices, and methods related to e-commerce, various changes may be made to the figures. For example, the designs of various devices and systems could vary as needed or desired, such as when components of a device or system are combined, further subdivided, rearranged, or omitted and additional components are added. As another example, while various methods are shown as a series of steps, various steps in each method could overlap, occur in parallel, occur in a different order, or occur any number of times. It will be understood that well-known processes have not been described in detail and have been omitted for brevity. Although specific steps, structures, and materials may have been described, this disclosure may not be limited to these specifics, and others may be substituted as it is well understood by those skilled in the art, and various steps may not necessarily be performed in the sequences shown.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Other changes, substitutions, and alterations are also possible without departing from the invention as defined by the following claims.

What is claimed is:

1. A processor-implemented method, comprising:
receiving information identifying multiple products or services offered by a merchant;
receiving information identifying multiple products or services offered by a vendor;
identifying base video content to be presented to a user;
performing video recognition on the base video content to identify at least one product or service shown in the base video content;
selecting, based on the at least one product or service identified in the base video content, (i) a first product or service from the multiple products or services offered by the merchant, and (ii) a second product or service from the multiple products or services offered by the vendor, such that the first product or service and the second product or service are related to the at least one product or service identified in the base video content;
generating supplemental content including additional information for the first product or service and the second product or service, the supplemental content including a user interface configured to allow a user to initiate a transaction for at least one of the first product or service or the second product or service;
dynamically binding the supplemental content to the base video content to form a shareable media container; and
sending the shareable media container including the dynamically bound supplemental content and base video content to an endpoint compute device associated with the user for display.

2. The method of claim 1, wherein the first product or service and the second product or service are further selected based on at least one of:
information associated with the vendor;
information associated with one or more customers; and
information associated with trends in products or services desired by customers.

3. The method of claim 1, further comprising
receiving criteria for the vendor including at least one of (i) a range within which a price for at least one of the multiple products or services offered by the vendor is dynamically adjustable or (ii) a time period in which the price for the at least one of the multiple products or services offered by the vendor is dynamically adjustable; and
selecting the first product or service based, at least in part, on the criteria.

4. The method of claim 1, wherein the information identifying the products or services offered by the vendor represents a sub-list of all products or services offered by a plurality of the vendors.

5. The method of claim 1, wherein:
the endpoint compute device is a first endpoint compute device, the method further comprising:
sending the shareable media container to a second endpoint compute device such that the base media content and the supplemental content dynamically bound to the base video content are displayed at the second endpoint compute device.

6. The method of claim 1, wherein:
the dynamically binding includes binding the supplemental content to the base video content upon the identifying the base video content, the method further comprising:
receiving a command to play the base video content at the endpoint compute device, the identifying the base video content being triggered by the command to play the base video content.

7. The method of claim 1, wherein:
the dynamically binding includes binding the supplemental content to the base video content, upon the identifying the base video content;
the sharable media container is configured to display the supplemental content dynamically bound to the base video content upon receiving a command to play the base video content; and
the endpoint compute device is a first endpoint compute device, the method further comprising:
sending the shareable media container to a second endpoint compute device such that the base media content and the supplemental content dynamically bound to the base video content are displayed at the second endpoint compute device upon receiving a command to play the base video content at the second endpoint compute device.

8. The method of claim 1, wherein:
the supplemental content is a first instance of the supplemental content;
the base video content is a first instance of the base video content; and
the dynamically binding includes binding the first instance of the supplemental content to the first instance base video content, upon the identifying the first instance of the base video content, to define the sharable media container; and
the endpoint compute device is a first endpoint compute device, the method further comprising:
sending the shareable media container to a second endpoint compute device such that the shareable media container is configured to:
instantiate a display of a second instance of the base video content at the second endpoint device,
determine, based on identifying the second instance of the base video content and based on the first instance of the supplemental content, a second instance of the supplemental content, and
dynamically bind the second instance of the supplemental content to be displayed with the second instance of the base video content at the second endpoint compute device.

9. The method of claim 4, further comprising:
receiving the sub-list from a vendor from the plurality of vendors.

10. The method of claim 4, further comprising:
automatically generating the sub-list; and
providing the sub-list to a vendor from the plurality of vendors for approval.

11. An apparatus, comprising:
at least one interface configured to receive information identifying multiple products or services offered by a merchant and information identifying multiple products or services offered by a vendor; and
at least one processing device in communication with the interface and configured to:
perform video recognition on base video content to identify a logo appearing in the base video content;
select, based on the logo identified in the base video content, (i) a first product or service from the multiple products or services offered by the merchant, and (ii) a second product or service from the multiple products or services offered by the vendor, such that the first product or service and the second product or service are related to the logo;
generate supplemental content including additional information about the first product or service and the second product or service, the supplemental content including a user interface configured to allow a user to initiate a transaction for at least one of the first product or service or the second product or service;
dynamically bind the supplemental content to the base video content to form a shareable media container; and
transmit the shareable media container including the dynamically bound supplemental content and base video content to an endpoint compute device associated with the user for display.

12. The apparatus of claim 11, wherein the at least one processing device is configured to select the second product or service further based on at least one of:
information associated with the vendor;
information associated with one or more customers; and
information associated with trends in products or services desired by customers.

13. The apparatus of claim 11, wherein:
the interface is configured to receive criteria for the vendor including at least one of (i) a range within which a price for at least one of the multiple products or services offered by the vendor is dynamically adjustable or (ii) a time period in which the price for the at least one of the multiple products or services offered by the vendor is not dynamically adjustable.

14. The apparatus of claim 11, wherein the information identifying the products or services offered by the vendor represents a sub-list of all products or services offered by a plurality of vendors.

15. The apparatus of claim 11, wherein:
the endpoint compute device is from a plurality of endpoint compute devices; and
the at least one processing device is further configured to define the shareable media container such that each endpoint compute device from the plurality of endpoint compute devices is configured to display the base media content and the supplemental content upon execution of the sharable media container.

16. The apparatus of claim 14, wherein the at least one processing device is further configured to receive the sub-list from a vendor from the plurality of vendors.

17. The apparatus of claim 14, wherein the at least one processing device is further configured to:

automatically generate the sub-list; and provide the sub-list to a vendor from the plurality of vendors for approval.

18. A non-transitory computer readable medium comprising computer readable program code that, when executed by at least one processing device, causes the at least one processing device to:

receive information identifying multiple products or services offered by a merchant;

receive information identifying multiple products or services offered by a vendor;

identify base media content to be presented to a user;

perform video recognition on the base media content to identify at least one product or service shown in the base media content;

select, based on the at least one product or service identified in the base video content, (i) a first product or service from the multiple products or services offered by the merchant, and (ii) a second product or service from the multiple products or services offered by the vendor such that the first product or service and the second product or service are related to the at least one product or service identified in the base media content;

generate supplemental content including additional information for the first product or service and the second product or service, the supplemental content configured to provide a user interface to allow a user to initiate a transaction for at least one of the first product or service or the second product or service;

dynamically bind the supplemental content to the base media content to define a shareable media container; and send the shareable media container including the dynamically bound supplemental content and base video content to a first endpoint compute device.

19. The non-transitory computer readable medium of claim 18, further containing computer readable program code that, when executed by the at least one processing device, causes the at least one processing device to:

receive criteria for the vendor that includes at least one of a range within which a price for a product or service offered by the vendor is dynamically adjustable or a time period in which the price for the product or service offered by the vendor is dynamically adjustable; and select the first product or service based, at least in part, on the criteria.

20. The non-transitory computer readable medium of claim 18, wherein the information identifying the products or services offered by the vendor represents a sub-list of all products or services offered by a plurality of vendors.

21. The non-transitory computer readable medium of claim 18, further containing computer readable program code that, when executed by the at least one processing device, causes the at least one processing device to:

receive, from the first endpoint compute device, an instruction to share the shareable media container with a second endpoint compute device;

send the sharable media container to the second endpoint compute device such that, when the second endpoint compute device receives the sharable media container, the second endpoint compute device displays the base media content and the supplemental content.

22. The non-transitory computer readable medium of claim 20, further containing computer readable program code that, when executed by the at least one processing device, causes the at least one processing device to:

receive the sub-list from a vendor from the plurality of vendors.

23. The non-transitory computer readable medium of claim 20, further containing computer readable program code that, when executed by the at least one processing device, causes the at least one processing device to:

automatically generate the sub-list; and provide the sub-list to a vendor from the plurality of vendors for approval.

\* \* \* \* \*